United States Patent [19]

Brunsell et al.

[11] Patent Number: 4,717,485

[45] Date of Patent: Jan. 5, 1988

[54] MULTI-PHASE SEPARATOR WITH POROUS FILTER DISKS

[76] Inventors: Zahra K. Brunsell; Dennis A. Brunsell, both of 4615 Christopher Pl., Houston, Tex. 77066

[21] Appl. No.: 904,834

[22] Filed: Sep. 9, 1986

Related U.S. Application Data

[63] Continuation of Ser. No. 689,819, Jan. 8, 1985, abandoned.

[51] Int. Cl.⁴ ............................................. B01D 33/26
[52] U.S. Cl. ................................... 210/781; 210/324; 210/347; 210/367; 210/378
[58] Field of Search ............... 210/781, 787, 324, 325, 210/365, 367, 369, 378, 380.1, 345, 346, 347, 372, 373, 332; 209/139, 144, 199, 211

[56] References Cited

U.S. PATENT DOCUMENTS

| | | | |
|---|---|---|---|
| 3,247,965 | 4/1966 | Braun et al. | 210/369 |
| 3,276,591 | 10/1966 | Hultsch | 210/369 |
| 3,973,984 | 8/1976 | Hentschel | 210/369 |
| 4,107,041 | 8/1978 | Karlson | 210/378 |
| 4,220,536 | 9/1980 | Dosoudil | 210/325 |
| 4,228,014 | 10/1980 | Timm et al. | 210/488 |
| 4,283,938 | 8/1981 | Epper et al. | 210/367 |
| 4,302,332 | 11/1981 | Hayakawa et al. | 210/369 |

Primary Examiner—Richard V. Fisher
Assistant Examiner—Wanda L. Millard
Attorney, Agent, or Firm—Finnegan, Henderson, Farabow, Garrett & Dunner

[57] ABSTRACT

An apparatus for separating multiple phases of solids or fluids includes an exterior housing having an interior chamber. A plurality of porous filter disks is positioned within the interior chamber and have a common central passage. The disks are capable of rotating around the central passage. An inlet introduces at least one fluid phase with or without a solid phase into the interior chamber near the central passage of the disks. A centrifugal force is created within the interior chamber to form a pressure differential across the disks to draw the fluid through the disks away from the central passage, while propelling any solids present in the interior from the central passage toward the exterior housing. The fluid drawn through the disks is collected at the periphery of the disks.

17 Claims, 12 Drawing Figures

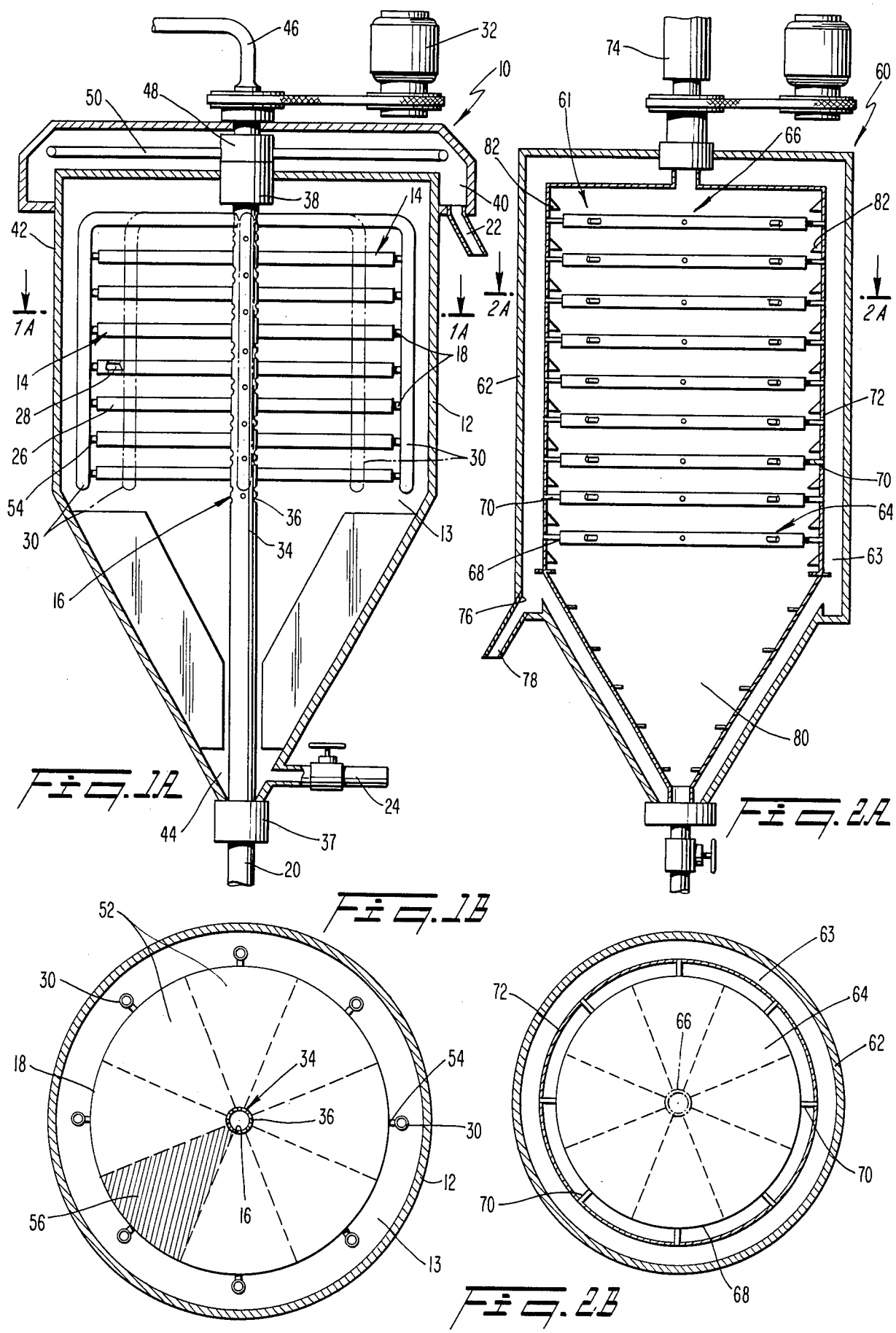

CENTRIFUGAL PRESSURE VS RADIUS OF DISK FOR WATER FLOW

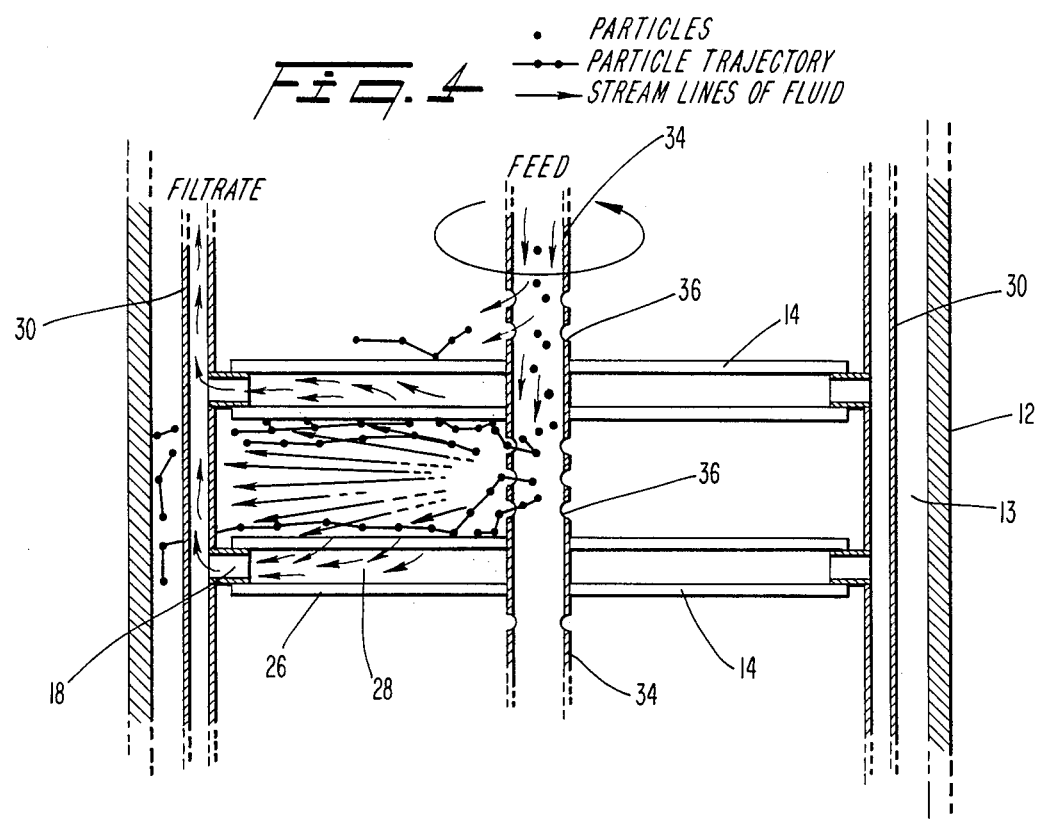
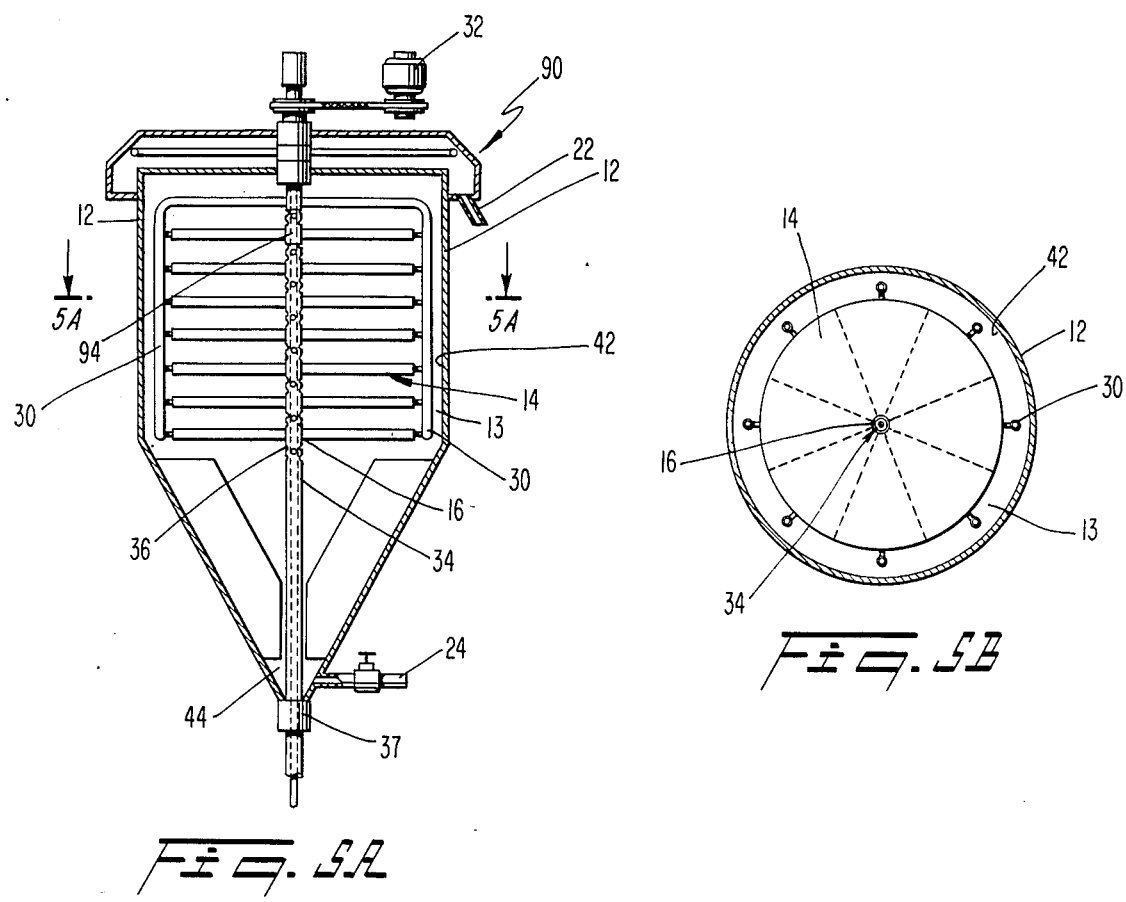

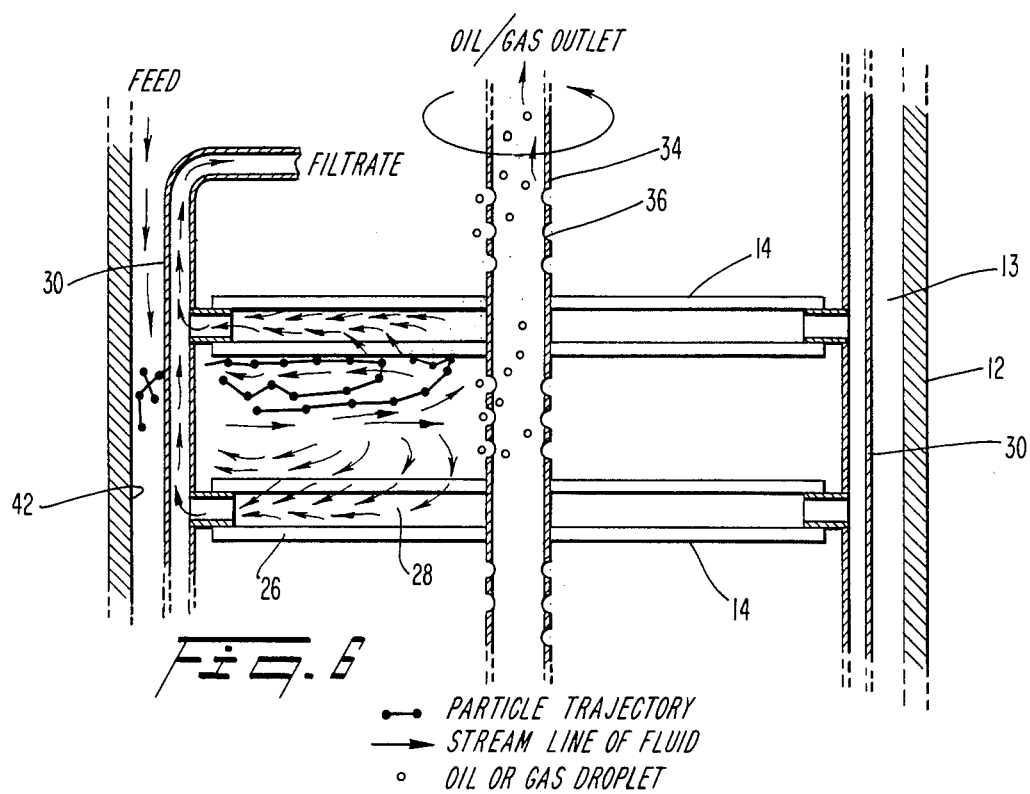
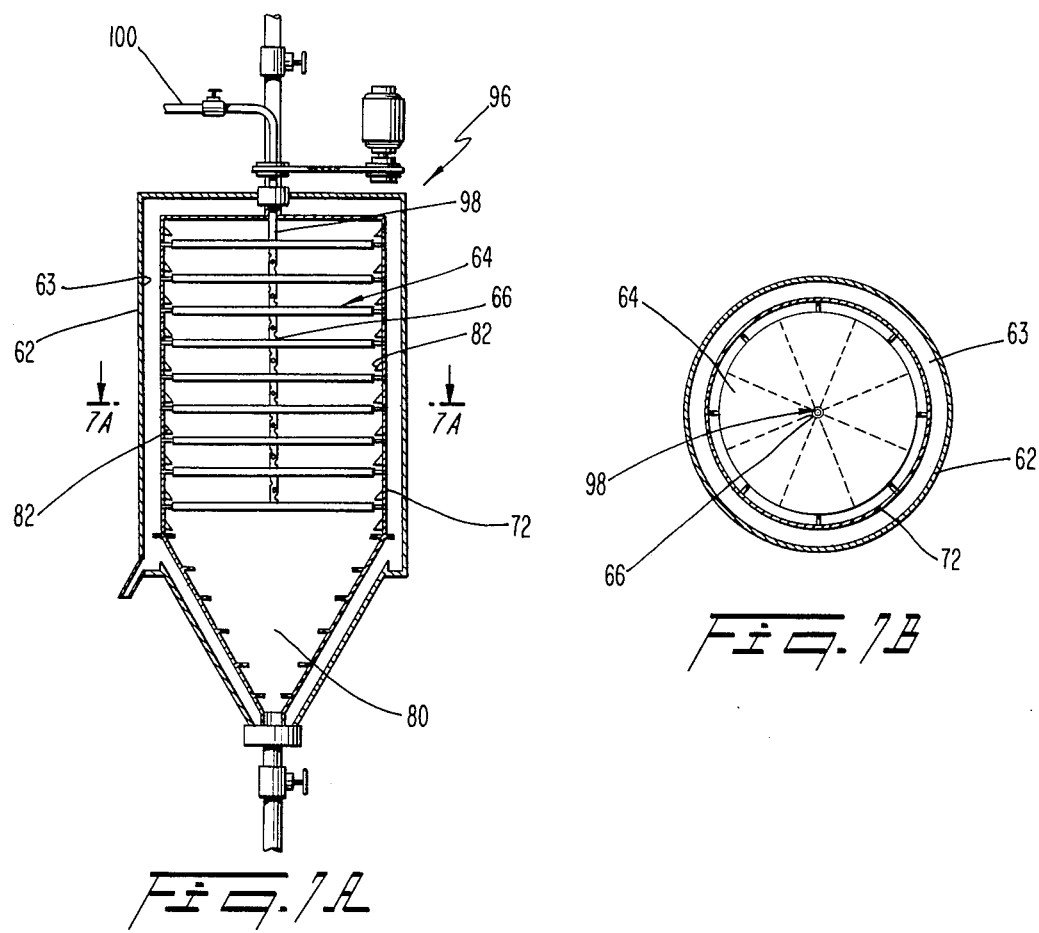

MULTI-PHASE SEPARATOR WITH POROUS FILTER DISKS

This application is a continuation of application Ser. No. 689,819, filed Jan. 8, 1985, now abandoned.

FIELD OF THE INVENTION

The present invention relates to the separation of multiple phases of solids or fluids and, more particularly, to the separation of the phases in solid/fluid, fluid/fluid or solid/fluid/fluid systems.

BACKGROUND OF THE INVENTION

The separation of solids from a fluid carrier and the separation of immiscible fluid phases from dispersions and emulsions are typically performed, for example, by various filtration, centrifugation, sedimentation, settling, or electrostatic separation techniques. Previous methods for multiple phase separation, such as solid/fluid phase and fluid/fluid phase separation, have advanced greatly, but there is still a need for even more effective methods to provide a more clarified fluid, while being relatively inexpensive to perform.

Although many conventional processes have been improved, there is yet a substantial need for further improvement. For example, the filtration removal of fines from water often rapidly clogs the filter media to result in greatly reduced flowrates and high pressure drops. Conventional techniques, such as a mechanical scraping, backwash, or media replacement are usually used to minimize this recurring problem. Many of these conventional techniques, however, are cyclic and require the periodic disruption of the filter flow and, hence, necessitate the restoration of the filtration rate after disruption.

This problem has been somewhat alleviated by cross-flow filtration techniques, such as the dynamic rotation of fluid filters and the formation of a turbulent flow in sintered porous tubes. For example, the apparatus of U.S. Pat. No. 3,995,447 to Breton requires the use of rotating disk filters that have hollow disks attached to hollow shafts for removal of the clarified filtrate. This design requires a pressure vessel and a relatively high pressure feed pump to overcome both the centrifugal force developed within the disks and the frictional pressure drop due to the flow in the porous media. The requirement of a pressure vessel adds to the cost of the filter apparatus and the presence of a centrifugal force opposite the direction of the solid particle flow limits the radius and the rotational speed of the disks.

In these axial filtrate collection systems, such as Breton, the centrifugal force limits the disk diameter and rotational speed, and requires that the filter vessel be able to withstand pressures of 50 to 100 psi or more. At these pressures, the colloidal particles in the suspension pass through the porous media close to the shaft of the disks and thereby clog the passageways of the hollow shafts. As a result the filtrate flowing through the central shaft decreases in rate.

The axial removal of filtrate in such a design is inhibited by an increase in the disk diameter or the disk rotational speed. In these devices, the diameter size limits the relation between the rotational speed of the disk and the pressure that can be applied to the disk to overcome the centrifugal force at the peripheral edge of the disk surface. As a consequence, a buildup of particles at the disk surfaces near an axial tube usually occurs, and the layer of particles deposited on this surface increases as the applied pressure is increased.

SUMMARY OF THE INVENTION

Therefore, a main objective of the present invention is a separation device that overcomes the aforementioned drawbacks.

It is a more specific objective of the present invention to enhance the separation of multiple phases of solid/fluid, fluid/fluid, or solid/fluid/fluid systems.

It is also an objective of the present invention to minimize the disruption of the flow through a separator apparatus and increase the economy of the process.

Additional objectives and advantages of the invention will be set forth from the description that follows and, in part, will be obvious from the description, or may be learned by practice of the invention. The objectives and advantages of the invention may be realized and obtained by means of instrumentalities and combinations particularly pointed out in the appended claims.

To achieve these and other objectives, the present invention provides an apparatus for separating multiple phases of solids or fluids. The apparatus comprises an exterior housing having an interior chamber and a plurality of porous filter disks positioned within the interior chamber and having a common central passage. The disks are capable of being rotated around the central passage. An inlet means introduces at least one fluid phase with or without a solid phase into the interior chamber near the central passage of the disks. A means for creating a centrigual force within the interior chamber is provided to form a pressure differential across the disks to draw the fluid through the disks and away from the central passage, while propelling any solids present in the interior chamber from the central passage toward the exterior housing. A means collects the fluid drawn through the disks at the periphery of the disks.

The present invention further provides a method of separating multiple phases of fluids and solids that comprises the steps of: introducing at least one fluid phase with or without a solid phase into an interior chamber of an exterior housing near a common central passage of a plurality of porous filter disks positioned within an interior chamber of the exterior housing, the disks being capable of being rotated around the central passage; creating a centrigual force within the interior chamber to form a pressure differential across the disks to draw the fluid through the disks and away from the central passage, while propelling any solids in the interior chamber from the central passage toward the exterior housing; and collecting at the periphery of the disks any fluid drawn through the disks.

The present invention overcomes the inherent disadvantages of previous conventional separators and methods, and meets the various objectives of the invention.

The present invention provides a method of clarifying a fluid, concentrating a suspension containing particular components, and separating immiscible fluid dispersions (gas/liquid) and emulsions (liquid/liquid). As a result, the present method produces nearly solid free liquids and gases for meeting various environmental and processing requirements. For example, the method can be used to recover oil from brine before discharging the brine back into the environment.

In the present invention, a suspension can be separated using porous disks rotating in a tank of fluid. The centrifugal force developed within the exterior housing forces the fluid that has already entered the disk to flow to the radial edges of the disks. The fluid drawn through the disks, exits the disks and thereby creates a low pressure area within the disks. The filtrate exits from the interior chamber of the housing to a collection system. Solids, which deposit momentarily on the surfaces of the disks, are thrown radially outwardly by the centrifugal force and they will fall toward a solid collection point at the bottom of the exterior housing, if the density of the solids is greater than the density of the liquid.

The separation apparatus of the present invention will operate at minimal head pressure. The apparatus can even be operated as a centrifugal pump to produce a draw if the apparatus, except for the inlets and outlets, is sealed to the atmosphere.

The foregoing and other objectives, features, and advantages of the present invention will be made more apparent from the following description of the preferred embodiments.

BRIEF DESCRIPTION OF THE DRAWINGS

The accompanying drawings, which are incorporated and constitute a part of the specification, illustrate embodiments of the invention and, together with the description serve to explain the principles of the invention.

FIG. 1A is a vertical section of an apparatus of the present invention.

FIG. 1B is a cross-sectional view of the apparatus of FIG. 1A taken along line 1A—1A.

FIG. 2A is a vertical section of another apparatus of the present invention.

FIG. 2B is a cross-sectional view of the apparatus of FIG. 2A taken along line 2A—2A.

FIG. 4 is a schematic representation of a flow pattern through the apparatus of the present invention shown in FIGS. 1A and 1B.

FIG. 5A is a vertical section of an apparatus of the present invention particularly suited for the separation of a solid phrase from two fluids phases.

FIG. 5B is a cross-sectional view of the apparatus of FIG. 5A taken along line 5A—5A.

FIG. 6 is a schematic representation of a flow pattern through the apparatus of the present invention shown in FIG. 5A.

FIG. 7A is a vertical section of an apparatus of the present invention particularly suited for the separation of a solid phase from two fluid phase.

FIG. 7B is a cross-sectional view of the apparatus of FIG. 7A taken along line 7A—7A.

DESCRIPTION OF THE PREFERRED EMBODIMENT

Figure 3:
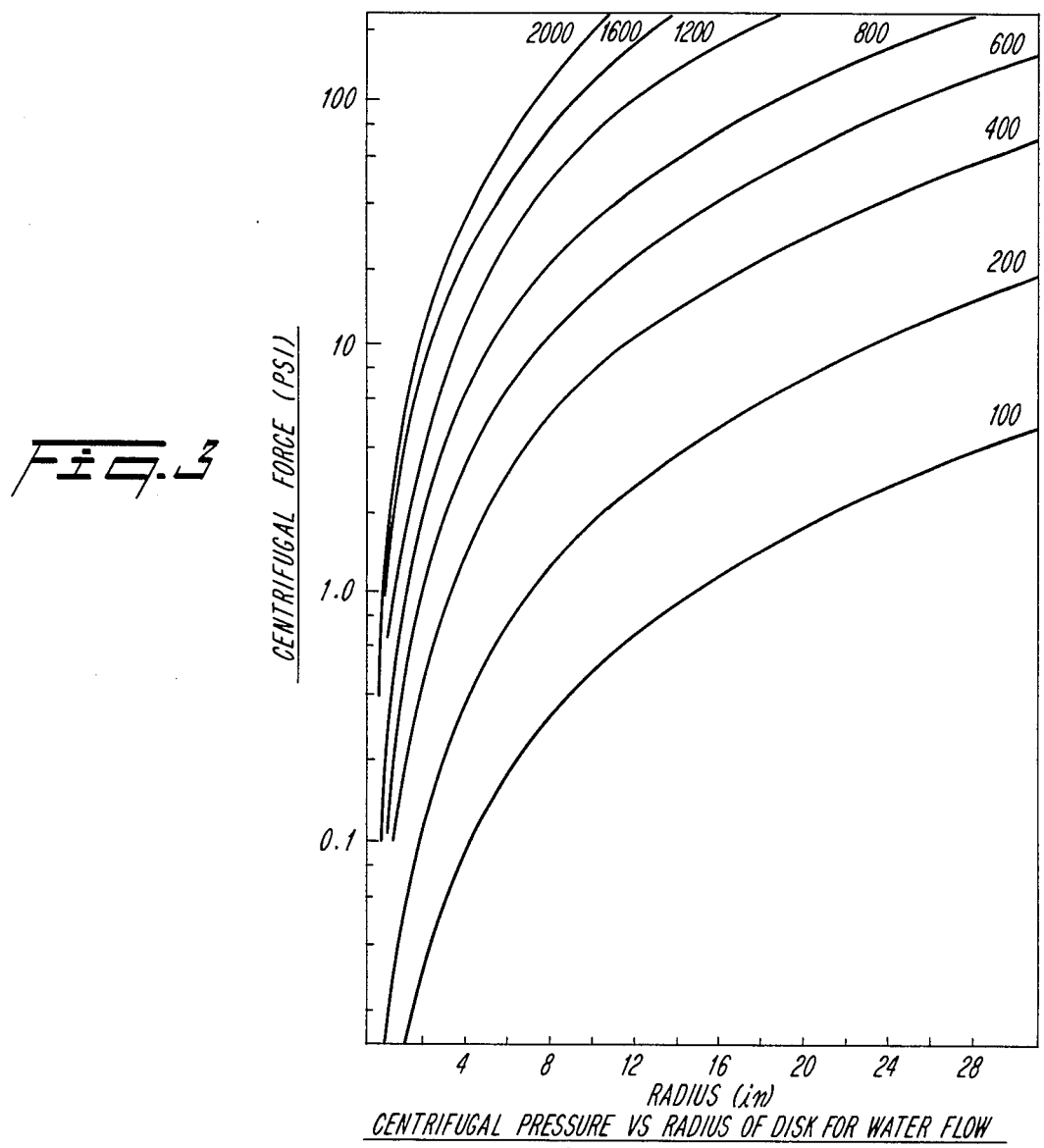
FIG. 3 is a graph of centrifugal force (p.s.i.) versus radius disk (inches) for various rotational speeds (RPM).

Reference will now be made in detail to the present preferred embodiments of the invention, examples of which are illustrated in the accompanying drawings.

In accordance with the present invention, a separation apparatus 10, illustrated in FIGS. 1A and 1B, separates multiple phases of solids or fluids. The apparatus 10 has an exterior housing 12 with an interior chamber 13. A plurality of porous filter disks 14 are positioned within the interior chamber 13 and have a common central passage 16. The disks 14 are capable of being rotated around the central passage 16. Inlet means introduce at least one fluid phase and a solid phase, if any, into the interior chamber 13 near the central passage 16 of the disks 14. A means for creating a centrifugal force within the exterior housing 12 is provided to form a pressure differential across the disks 14 to draw the fluid through the disks 14 and away from the central passage 16, while propelling any solids in the interior chamber 13 from the central passage 16 toward the exterior housing 12. A means collects the fluid drawn through the disks 14 at the periphery 18 of the disks 14.

In the embodiment of FIG. 1A, the inlet means is a inlet line 20 through which one or more fluid phases and a solid phase, if any, are introduced into the interior chamber 13 near the central passage 16 of the disks 14. The apparatus 10 in FIG. 1A can be fed a slurry containing a solid component through inlet line 20. The slurry is subsequently separated in the apparatus into two streams, a solids free filtrate that exits the interior chamber 13 through filtrate exit line 22 and a concentrated slurry that leaves the interior chamber 13 through slurry exit line 24.

The actual filter media is the porous disks 14. The disks 14 are preferably manufactured from sintered metals, plastics, ceramics, glass or other porous media having an average pore size approximately equivalent to the smallest size particles in the slurry. Only the outer surfaces 26 of the disks 14 are maintained at this particular pore size. The interiors 28 of the disks 14 are either hollow or highly porous to minimize the pressure drop across the disks 14 from the centrifugual force and to promote the free flow of the filtrate toward the peripheral edges 18 of the disks 14.

In the embodiment of FIG. 1A, the collecting means is a collection manifold 30 attached to the peripheral edges 18 of the disks 14. The filtrate flows through the disks 14 toward the collection manifold 30 due to the centrifugal force created by the rotation of the disks 14.

Preferably, the means for creating a centrifugal force within the housing 12 is a motor 32 attached to an axial tube 34 that passes through the central passage 16 of the disks 14. When energized, the motor 32 rotates the axial tube 34 to cause rotation of the disks 14. The disks 14 are attached to the axial tube 34 along the disks' central passage 16, and the collection manifold 30 is attached to the disks 14 along each disk's peripheral edge 18. Bearings 37 and 38 support the axial tube 34 and the disks 14 to maintain free rotational seals.

The slurry is generally pumped through the hollow axial tube 34 and out into the interior chamber 13 through various feed holes or perforations 36 in the axial tube 34. The pressure on the exterior of the disks 14 is maintained higher than the pressure on the interior of the disks 14 by use of a pressure vessel, a centrifugal pumping action, or a combination thereof. The clear filtrate is then collected in a trough 40 and drained from the housing through the filtrate exit line 22.

The solids in the slurry are propelled to the outer wall 42 of the exterior housing 12 as a result of the centrifugal force acting on the disks' outer surfaces 26. Likewise, the higher specific gravity of the solid particles relative to the specific gravity of the fluid aids in propelling the particles to the wall 42. Gravity then acts upon the solids to pull the solids down from the wall 42 to the cone 44 at the base of the interior chamber 13. In the cone 44, the thickening of the solids occurs prior to the discharge of the solids from the exterior housing 12 through the exit line 24.

As shown in FIG. 1B, the disks 14 can be made of a single piece or several segments with each pie shaped piece 52 representing a filtering unit. The inner and outer edges of the disk are sealed to prevent fluid leakage, and only holes 54 connecting the disks 14 to the collector manifold 30 are present. The filter area 56 of a segment is shown. The slurry is supplied to both sides of the disk through the perforations 36 in the axial tube 34.

Periodically, a backwash is performed by stopping the slurry feed through the inlet line 20 and, instead, using the inlet line 20 as an outlet while a clear filtrate, such as a liquid, air, or gas, is pulsed under high pressure through a line 46 which shuttles valve 48 to close off a line 50. The backwash displaces the solid particles attached to the outer surfaces 26 of the disks and propels solids into the bulk solution for collection in the cone 44 or removal through the exit line 24. Baffles can be also placed at the bottom of the exterior housing 12 to promote the settlement of the solid particles by decreasing mixing and inhibiting the formation of a vortex.

The disks 14 are rotated during all operations of the apparatus 10 to prevent solid particles from settling on the top surfaces 26 of the disks 14. The rotational speed varies preferably over a range of 100 to 2000 rpm depending upon the diameter of the disks 14, the materials from which the disks 14 are constructed, and the particular characteristics of the slurry. For disks 14 that are in the range of one to six feet in diameter, in most cases, a rotational speed in the range of 50–2000 rpm is required. However, other rotational speeds can be used within the scope of the invention. The centrifugal force created by the disk rotation at a given point in the interior chamber 13 is dependent upon the point's distance from the central passage 16 and the angular velocity.

The present invention has the advantage over previous rotating disk filters of actually increasing the differential pressure across the disk surfaces 26 by increasing the disk rotational speed. This causes an increased centrifugal force on the liquid within the disks 14 and the collection manifold 30.

The outward flow of fluid through the disks 14 creates a partial vacuum within the disks 14 that acts as the driving force for the liquid phase to diffuse through the pores of the disks 14. Since centrifugal force is proportional to the linear acceleration in the axial direction, which is determined by rotational speed and diameter, an increase in either the disk rotational speed or the disk diameter will increase the centrifugal force.

In contrast, in the present invention, the relatively higher rotational speeds increase the probability that a solid particle will be thrown from the surfaces 26 of the disks 14. Hence, the cycle time between backflushings is increased and, subsequently, the overall filtration rate is also increased.

The slurry solid content that is separated by the apparatus 10 can vary from nil to the limits required to be pumped or flow through pipes. The filter disks 14 are generally best suited for slurries containing less than 10% solids and, preferably, less than 1% solids, although higher concentrations can also be accommodated.

The actual size of the filter disks 14 is determined by the volume rate of fluid to be processed and the particular characteristics of the slurry or fluid dispersion. These may include, but are not limited to, particle size and density, suspension viscosity, surface tensions, adhesion characteristics, filter disk material and porosity, and slurry concentrations. The variation of centrifugal forces formed between the central passage 16 and the disk peripheral edge 18 limits the active surface area at a given angular velocity. The structural integrity of the disk 14 is, most likely, the single largest factor in limiting the angular velocity of the disk.

Unlike most conventional methods that withdraws filtrate through the axis of the disk filters by using a pump to supply the required differential pressure to drive the filtrate across the disk, it is believed, without being bound by theory, that the present system utilizes centrifugal force to draw the fluid through the disks 14 in a manner similar to the operation of a centrifugal pump. Exterior pressure can also be applied to the interior chamber 13 to increase the throughput of the fluid through the disks 14, but this pressure is not essential to the filter operation. A typical driving force for such a pressure pump is in the range of 50 to 1000 kPa (7 Psia to 140 Psia), but other driving forces are acceptable within the scope of the invention.

Another embodiment of the present invention is depicted in FIGS. 2 and 2B. The apparatus 60 of FIG. 2A has an exterior housing 62 with an interior chamber 63. A plurality of porous filter disks 64, each having a central passage 66, are positioned within the interior chamber 63. Each disk 64, at its peripheral edge 68, is attached by a tube 70 to an inner barrel 72 that is positioned within the interior chamber 63 adjacent to the exterior housing 62. The fluid enters the interior chamber 61 near the central passage 66 through an inlet line 74.

As a centrifugal force is created within the interior chamber 61 upon rotation of the disks 64, a pressure differential is created across the disks 64 to draw the fluid away from the central passage 66, through the disks 64 and the tubes 70 to the inner barrel 72. The drawn fluid then drains down the inner barrel 72 to the passages 76 positioned at the base of the interior chamber 63. The fluid is subsequently removed from the interior chamber 63 through an exit line 78.

The solid particles contained within the fluid are thrown against the sides of the inner barrel 72 by centrifugal force and the particles are transported to a cone area 80 by a combination of gravity and the spiral advancing ribs 82 on the inner barrel 72. The advancing ribs 82 take advantage of the shearing of the liquid against the inner barrel wall and advance the solid particles downwardly to the cone area 80.

The barrel design shown in FIG. 2A can be constructed with or without an axial perforated tube passing through the central passage 66. The fluid is preferably fed from the top of the apparatus 63 so as it flow through the central passage 66 of the disks 64. The solid particles, as a result of the centrifugal force, pass between the disks 64 until they impinge on the barrel 72.

As shown in FIG. 2B, the filter disk 64 can be either of a single construction or made from several segments. If segmented, each filter segment is to be attached by at least one tube 70 to the barrel 72 to drain the filtrate from the disks 74. The center passage 66 permits the flow of the slurry from the inlet line 74 at the top of the tank to all of the filter disks 64.

Various other embodiments of the present invention, which are especially useful in the separation of two fluid phases or two fluid phases and a solid phase, are shown in FIGS. 5–7. The separation apparatus 90 of FIGS. 5A and 5B is constructed in the same manner as the apparatus 10 of FIG. 1A, except that a perforated axial tube 34 is positioned within the central passage 16 of the filter disks 14.

In operation, the interior chamber 13 of the apparatus 90 of FIG. 5A receives two fluid phase, which also may contain a solid phase, through the inlet line 20. A suitable two phase fluid is oil and water. The axial tube 34, inserted through the central passage 16 of the disks 14, is used to withdraw the lighter fluid phase, such as oil in an oil and water mixture, through the perforations 36 in the axial tube 34. The lighter fluid phase, such as oil, collects near the axial tube 34 due to the differences in specific gravity between the various fluid phases. With the perforated axial tube 34 acting as a collector for the lighter fluid phase, the lighter fluid phase can easily be drawn off from the heavier fluid phase. A float 94 can be used to close the oil line whenever almost all of the oil is withdrawn from the remaining fluid phase by adjusting the float density to a value between the heavier and lighter fluid phases.

As shown in the schematic drawing of FIG. 6, the heavier fluid phase and the solid particles are propelled outwardly toward the exterior housing 12, as in the apparatus of FIGS. 1A and 2A. The heavier fluid phase, after being drawn through the filter disks 14, is collected in the collector manifold 30 and removed from the interior chamber 13 through the exit line 22. The solid particles, if any, are pulled by gravity down the side walls 42 of the housing 12 to the cone area 44, from which area the solids are removed from the interior chamber 13 through the exit line 24.

Likewise, the apparatus 96 of FIGS. 7A and 7B is constructed similar to the apparatus 60 of FIGS. 2A and 2B, except that a perforated axial tube 98 is positioned through the central passage 66 of the filter disks 64. An inlet line 100 is positioned at the top of the housing 62 near the central passage 66.

As in FIG. 6, the lighter fluid phase in the apparatus 96 of FIG. 7A is collected through the axial tube 98 due to the differences in the specific gravity of the fluid phases. The heavier fluid phase is collected by the inner barrel 72 at the peripheral edges 68 of the disks 64. The solid particles, if any, are thrown against the sides of the inner barrel 72 and they are transported to the cone area 80 by gravity and the advancing ribs 82.

Figure 8:
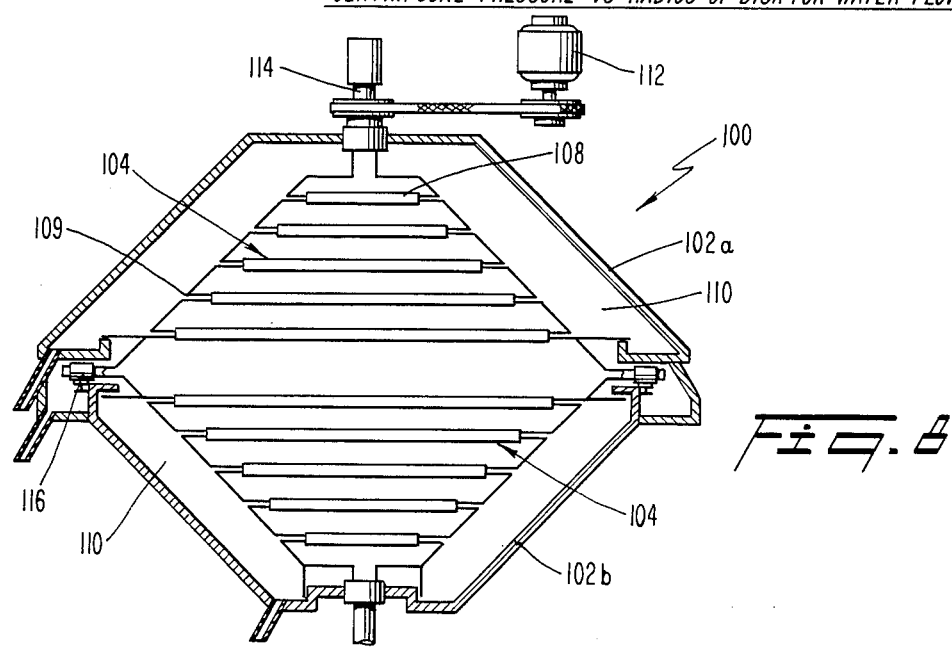
FIG. 8 is a vertical section of another apparatus of the present invention.

Another alternative embodiment of the present invention is an apparatus 100 shown in FIG. 8. The apparatus 100 has two exterior housing portions 102a and 102b that are positioned together to form a diamond shape. A plurality of porous filter disks 104 are positioned within the interior chamber 110 of the exterior housing portions 102a and 102b. The disks 104 have a common central passage 108. Each of the disks 104 are attached at their peripheral edges 109 to a collection drum 110 that is positioned within the interior chamber 106 adjacent to the exterior housing portions 102a and 102b. A centrifugal force is created within the interior chamber 106 by a motor 112 that rotates the disks 104.

A fluid phase containing one or more solid phase is introduced into the central passage 108 of the disks 104 through an inlet line 114. The centrifugal force within the interior chamber 106 propels the solid particles to the exterior housing portions 102a and 102b. A periodic opening of the exit valves 116 allows the solid particles to be discharged from the apparatus 100.

The present invention also provides a method of separating multiple phases of solids or fluids. In the method, at least one fluid phase, with or without a solid phase, is introduced into an interior chamber of an exterior housing near a central passage of a plurality of porous filter disks positioned within the interior chamber of the exterior housing. The disks have a common central passage and they are capable of being rotated around the central passage. A centrifugal force is created within the interior chamber to form a pressure differential across the disks to draw the fluid phase through the disks away from the central passage, while propelling any solids in the interior chamber from the central passage toward the exterior housing. At the periphery of the disks, the fluid phase drawn through the disks is collected.

It will be apparent to those skilled in the art that various other modifications and variations could be made in the structure and method of the invention without departing from the scope and content of the invention.

What is claimed is:

1. An apparatus for separating multiple phases of solids or fluids with at least one fluid comprising:
   (a) an exterior housing having an interior chamber;
   (b) a plurality of porous filter disks positioned within the interior chamber around a common central passage and having no opening common to the central passage, each filter disk comprising a first member and a second member including a fluid passage defined therebetween, the disks capable of being rotated around the central passage;
   (c) inlet means for introducing at least one fluid phase with or without a solid phase into the interior chamber through or near the central passage of the disks;
   (d) means for creating a centrifugal force within the interior chamber to form a pressure differential within the fluid passages within the disks to draw the fluid inside the disks into the fluid passages and away from the central passage while propelling any solids present in the interior chamber away from the central passage and the disk surfaces toward the exterior housing; and
   (e) means for collecting the fluid passing into the fluid passages of the disks at the periphery of the disks.

2. The apparatus of claim 1, wherein the inlet means is an inlet line.

3. The apparatus of claim 1, wherein the means for creating a centrifugal force comprises an axial tube passing through the central passage of the filter disks and a motor attached to the axial tube.

4. The apparatus of claim 1, wherein the collecting means is a collection manifold attached to the peripheral edges of the disks.

5. The apparatus of claim 1, further comprising exit means for removing the separated solid and fluid phases from the interior chamber.

6. The apparatus of claim 5, wherein the exit means is an exit line.

7. The apparatus of claim 1, wherein a perforated axial tube is positioned through the central passage of the disks.

8. The apparatus of claim 1, further comprising a means for rotating the disks at a rotational speed in the range of 50 to 2000 RPM.

9. The apparatus of claim 1, wherein the filter disks are attached substantially perpendicular to the common central passage.

10. A method of separating multiple phases of solids or fluids with at least one fluid that comprises the steps of:

(a) introducing at least one fluid phase with or without a solid phase into an interior chamber of an exterior housing near a common central passage of a plurality of porous filter disks positioned within the interior chamber of the exterior housing and around the common central passage, each filter disk comprising a first member and a second member including a fluid passage defined therebetween, the disks being capable of being rotated around the central passage;

(b) creating a centrifugal force within the interior chamber to form a pressure differential within the fluid passages within the disks to draw the fluid phase inside the disks into the fluid passages and away from the central passage while propelling any solids in the interior chamber away from the central passage and the disk surfaces toward the exterior housing; and (c) collecting at the periphery of the disks the fluid phase drawn through the fluid passages of the disks.

11. The method of claim 10, wherein the filter disks are attached substantially perpendicular to the common central passage.

12. The method of claim 10, further comprising the step of pressurizing the interior chamber during step (b).

13. An apparatus for separating two fluid phases comprising:

(a) an exterior housing having an interior chamber;

(b) a plurality of porous filter disks positioned within the interior chamber and having a common central passage, each filter disk comprising a first member and a second member including a fluid passage defined therebetween;

(c) a perforated axial tube positioned through the central passage of the disks, the disks capable of being rotated around the perforated axial tube;

(d) inlet means for introducing a lighter fluid phase and a heavier fluid phase into the interior chamber;

(e) means for creating a centrifugal force within the interior chamber to separate the two fluid phases into the lighter fluid phase passing into the perforated axial tube and the heavier fluid phase being drawn through the fluid passages of the disks away from the axial tube; and (f) means for collecting the heavier fluid phase drawn through the fluid passages of the disks.

14. The apparatus of claim 13, further comprising an exit means for removing the lighter fluid phase from the axial tube.

15. The apparatus of claim 13, further comprising a means for rotating the disks at a rotational speed in the range of 50 to 2000 RPM.

16. The apparatus of claim 1, further comprising a means for pressurizing the interior chamber.

17. The apparatus of claim 13, wherein the filter disks are attached substantially perpendicular to the common central passage.

* * * * *